(12) United States Patent
Syed et al.

(10) Patent No.: US 12,469,550 B2
(45) Date of Patent: Nov. 11, 2025

(54) PHOTONIC CONTENT-ADDRESSABLE MEMORY AND APPLICATIONS THEREOF

(71) Applicant: International Business Machines Corporation, Armonk, NY (US)

(72) Inventors: Ghazi Sarwat Syed, Zurich (CH); Abu Sebastian, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 471 days.

(21) Appl. No.: 17/938,373

(22) Filed: Oct. 6, 2022

(65) Prior Publication Data

US 2024/0119999 A1 Apr. 11, 2024

(51) Int. Cl.
G11C 15/04 (2006.01)
G11C 11/42 (2006.01)
G11C 11/56 (2006.01)

(52) U.S. Cl.
CPC .......... *G11C 11/42* (2013.01); *G11C 11/5628* (2013.01); *G11C 15/04* (2013.01)

(58) Field of Classification Search
CPC ........................... G11C 11/5628; G11C 11/42
See application file for complete search history.

(56) References Cited

U.S. PATENT DOCUMENTS 11,057,143 B1 * 7/2021 Van Vaerenbergh .. G11C 15/00
11,469,764 B2 10/2022 Seyedi 2018/0137916 A1 5/2018 Salama
2021/0050060 A1 2/2021 Li
2022/0012013 A1 1/2022 Sebastian
2022/0059147 A1 2/2022 Van Vaerenbergh
(Continued)

FOREIGN PATENT DOCUMENTS

CN 204229006 U 3/2015

OTHER PUBLICATIONS

A. J. McAuley and C. J. Cotton, "A reconfigurable content addressable memory," IEEE Proceedings of the Custom Integrated Circuits Conference, 1990, pp. 24.1/1-24.1/4, doi: 10.1109/CICC.1990.124785.

(Continued)

*Primary Examiner* — Alfredo Bermudez Lozada
(74) *Attorney, Agent, or Firm* — Kimberly Zillig (57) ABSTRACT

Photonic content-addressable memories (CAMs) and applications thereof are provided. The CAM includes a photonic cross-bar array comprising a plurality of row and column waveguides, and a plurality of photonic filter devices. Each filter device is selectively programmable in first and second states representing respective stored bit values that filters out light according to the programming. An encoder for encoding a plurality of input bit-strings into optical signals such that bit values in different bit-strings are encoded using optical signals in different pairs of optical states, and to simultaneously supply the optical signals corresponding to each bit-position in the bit-strings to a respective row waveguide of the array. The CAM further comprises a detector for detecting light in any of said optical states in each column waveguide, thereby identifying any mismatch between each input bit-string and bit values stored in the filter devices coupling light to that waveguide.

17 Claims, 10 Drawing Sheets

(56) References Cited

U.S. PATENT DOCUMENTS

2022/0069829 A1 3/2022 Seyedi
2024/0296886 A1* 9/2024 Sian .................. G11C 15/00

OTHER PUBLICATIONS

Alkabani, Yousra & Miscuglio, Mario & Sorger, Volker & El-Ghazawi, Tarek. (2020). OE-CAM: A Hybrid Opto-Electronic Content Addressable Memory. IEEE Photonics Journal. pp. 1-1. 10.1109/JPHOT.2020.2966748.

Chastity Cameron "What's inside a router. Router architecture overview two key router functions: run routing algorithms/protocol (RIP, OSPF, BGP) forwarding datagrams." SLIDEPLAYER.com. https://slideplayer.com/slide/6848966/ <Retrieved from internet on Sep. 15, 2022>.

Davis, William & Oh, Eun & Sule, Ambarish & Franzon, Paul. (2009). Application exploration for 3-D integrated circuits: TCAM, FIFO, and FFT case studies. Very Large Scale Integration (VLSI) Systems, IEEE Transactions on. 17. 496-506. 10.1109/TVLSI.2008.2009352.

George Mourgias-Alexandris, Christos Vagionas, Apostolos Tsakyridis, Pavlos Maniotis, and Nikos Pleros, "All-optical 10Gb/s ternary-CAM cell for routing look-up table applications," Opt. Express 26, 7555-7562 (2018) https://opg.optica.org/oe/fulltext.cfm?uri=oe-26-6-7555&id=383498.

K. P. Gnawali and S. Tragoudas, "High-Speed Memristive Ternary Content Addressable Memory," in IEEE Transactions on Emerging Topics in Computing, vol. 10, No. 3, pp. 1349-1360, Jul. 1-Sep. 2022, doi: 10.1109/TETC.2021.3085252.

Mike Butcher, (2022) " Salience Labs raises $11.5 million seed round" TECHCRUNCH.com, https://techcrunch.com/2022/05/12/this-startup-hopes-photonics-to-will-get-us-to-ai-systems-faster/ <Retrieved from the internet on Sep. 15, 2022>.

Quashef, M.A.Z., Alam, M. Ultracompact photonic integrated content addressable memory using phase change materials. Opt Quant Electron 54, 182 (2022). https://doi.org/10.1007/s11082-022-03569-z.

Guccione, S.A., Levi, D., Downs, D. (2000). A Reconfigurable Content Addressable Memory. In: Rolim, J. (eds) Parallel and Distributed Processing. IPDPS 2000. Lecture Notes in Computer Science, vol. 1800. Springer, Berlin, Heidelberg. https://doi.org/10.1007/3-540-45591-4_122.

Vahid Tabatabaee (2007) "Content Addressable Memories." SLIDEPLAYER.com. https://slideplayer.com/slide/5129075/ <Retrieved from internet on Sep. 15, 2022>.

PCT/IB2023/056187 International Search Report and Written Opinion, mailed Sep. 12, 2023, 7 pgs.

* cited by examiner

PHOTONIC CONTENT-ADDRESSABLE MEMORY AND APPLICATIONS THEREOF

BACKGROUND

The present disclosure relates generally to photonic content-addressable memory and applications thereof. Photonic content-addressable memories are provided together with devices and methods exploiting such memories.

Content-addressable memory is a type of associative memory that can perform search operations with O(1) time complexity. In a content-addressable memory (CAM), data is addressed by the data content rather than data address as in traditional memories such as RAM (Random-Access Memory) and hard disks. The input to the memory is a bit-string (the "search word" or "search vector") which is compared with a plurality of bit-strings stored in the memory. The stored bit-strings can be stored in an array of memory cells connected between a set of input search lines and a set of output match lines. The input search word is applied on the search lines, and the output on a match line indicates whether the search word matches the word stored in cells connected to that match line. A match line is typically pulled low (logic 0) if any bit in the search word does not match the corresponding bit of the stored word, whereby a high match line (logic 1) indicates a match. For binary CAM operation, all input search bits must match the corresponding stored bits. In ternary CAMs (TCAMs), the memory cells can store a third, "don't-care" bit value X which matches both input bit values 0 and 1.

CAMs are popularly used for high-speed searches for data routing in network switching devices (routers, switches, gateways, etc.). Here, the CAM is used to determine the appropriate output ports for forwarding of data packets arriving at the input ports. Routing bandwidth is limited by the speed with which these searches can be performed. Other applications include cache memories, decision trees, neural networks and data mining, among various others.

CAMs are commonly implemented using digital electronics. A typical SRAM (Static Random-Access Memory) TCAM memory cell requires 2 SRAM bit cells and an additional 4 transistors. Memristive TCAM cells are an emerging hardware approach which reduces the power consumption and space complexities incurred with digital CAM. Typical memristive hardware uses 6T2M (6 transistor, 2 memristor) CAM cells, 2T2M cells, or 5T2M cells, that mitigate the requirements of SRAM- or DRAM-based CAM cells. While memristive CAMs address the space and latency issues of digital CAM to some extent, these issues remain a problem for many applications.

Optical, or photonic, CAM is another promising approach. These CAMs process input search words encoded in optical, rather than electrical, signals and offer high-speed operation by processing data at the speed of light. While such CAMs offer faster operation than their electronic counterparts, they rely on the same basic operating principles, and current photonic CAMs are not sufficiently area/time and/or energy efficient to meet the ever-increasing demands for miniaturization, speed and efficiency in CAM applications.

SUMMARY

A first aspect of the present disclosure provides a photonic content-addressable memory. The photonic CAM includes a photonic cross-bar array comprising a plurality of row and column waveguides, and a plurality of photonic filter devices, each located at a respective cross-point of the row and column waveguides for selectively coupling light from the row waveguide to the column waveguide at that cross-point. Each filter device is selectively programmable in first and second states representing respective stored bit values. Each filter device is operable, in the first programmable state, to filter out light in any of a first plurality of optical states from light coupled to the column waveguide and, in the second programmable state, to filter out light in any of a second, different plurality of optical states from light coupled to the column waveguide. The CAM incudes an encoder for encoding a plurality of input bit-strings into optical signals such that bit values in different bit-strings are encoded using optical signals in different pairs of optical states, each pair comprising one state from each of said first and second plurality, and to simultaneously supply the optical signals corresponding to each bit-position in the bit-strings to a respective row waveguide of the array. The CAM further comprises a detector for detecting light in any of said optical states in each column waveguide, thereby identifying any mismatch between each input bit-string and bit values stored in the filter devices coupling light to that waveguide.

Unlike prior CAMs in which input search words are processed serially, i.e. one a time, embodiments of this disclosure offer photonic CAMs in which multiple search words can be searched simultaneously. If light in either of the optical states used for encoding a given input bit-string is detected on a column waveguide, then the bit-string does not match that stored in the filter devices associated with that column waveguide. Since different pairs of optical states are used for encoding each input word, multiple input words can be searched in parallel with O(1) time complexity. This offers orders of magnitude higher processing speeds than current state-of-the-art CAMs. Moreover, the memory is implemented in a compact photonic cross-bar array in which the photonic filter devices storing bit-strings are the same at each cross-point. This offers exceptionally-simple, area-efficient, integrated CAMs with superfast operation.

Embodiments of the disclosure can be readily configured for ternary CAM operation. Here, the encoder is adapted to encode input bit-strings comprising bit values 0, 1 and X, where X indicates a don't-care bit. Bit values 0 and 1 in a bit-string are encoded using optical signals in the associated pair of optical states, and a bit value X is encoded as zero signal. No signal will therefore be detected for an input bit of value X, indicating a match with the corresponding stored bit value, whether 1 or 0.

The optical states used for encoding input bit-strings may correspond to respective wavelengths of light, whereby the optical signals encoding the input bit-strings are wavelength-division multiplexed on the row waveguides. Other embodiments may use different polarization states of light.

The photonic filter devices are conveniently implemented by a directional coupler for coupling light from the row waveguide to the column waveguide at a cross-point, and a programmable filter for operation in the first and second programmable states. Here, the directional couplers can be adapted for equal distribution of optical power between column waveguides of the array, simplifying operation at the detector. In embodiments based on wavelength-division multiplexing, the programmable filter can be a frequency filter. In preferred embodiments, the frequency filter comprises first and second ring resonators which are operable to filter out light in the first and second programmable states respectively. These embodiments can exploit a plurality of resonance wavelengths of the ring resonators to filter out optical signals with the required wavelengths. The ring resonators may include respective memory elements, and preferably non-volatile elements such as phase-change memory elements, which are programmable to tune the ring resonators for operation in the first and second programmable states. This provides a non-volatile, easily-programmable array for highly energy-efficient operation.

CAMs embodying the disclosure also offer the facility for in-memory logic computations to accommodate application-level requirements. In particular, the encoder can be operable to encode, for each input bit-string, at least one additional, logic bit associated with that bit string using at least one additional optical signal in at least one additional optical state, different to states in the first and second plurality of states. The additional optical signals for corresponding logic bits of the bit-strings are supplied simultaneously to a row waveguide of the array. Here, the memory also includes a plurality of programmable logic devices arranged for selectively coupling the additional optical signals to the column waveguides, and the detector is operable to detect the additional optical signals in each column waveguide. Operation of such in-memory logic will be explained further below.

The output of CAMs embodying the disclosure can be adapted to the requirements of a particular application. For a simple match search, for example, the detector can be adapted to produce an output indicating, for each column waveguide, whether each input bit-string matches the bit values stored in the filter devices coupling light to that waveguide. In addition, or as an alternative, the detector may be connected to logic for performing a desired processing operation dependent on the detection results. Examples of such processing operations will be described below.

Memory apparatus embodying the disclosure may comprise a plurality of CAMs as described above, and a memory controller for supplying input bit-strings in parallel to the plurality of CAMs. Such memory apparatus may use the CAMs for various parallel search operations, allowing parallel searching of more words and/or parallel searches for longer words distributed over multiple arrays.

Another aspect of the disclosure provides a network switching device having a plurality of input ports for receiving input data packets and a plurality of output ports for output of data packets. The device comprises a switch fabric for forwarding input data packets to the output ports in dependence on respective address bit-strings in the input packets, and a switch controller comprising at least one CAM as described above for storing the address bit-strings in the filter devices of the CAM. The switch controller is adapted to provide the address bit-strings of a plurality of data packets as the input bit-strings to said at least one CAM, and to determine the output ports for forwarding of those data packets in dependence on matching of the input bit-strings to stored address bit-strings.

A further aspect of the disclosure provides a method for simultaneously comparing a plurality of first bit-strings with each of a plurality of second bit-strings. The method includes storing each second bit string in a CAM described above such that successive bits are stored in filter devices located at successive cross-points of a column waveguide with the row waveguides. The method further comprises supplying the plurality of first bit-strings as said input bit-strings to the encoder of the CAM, and determining a comparison result in dependence on detection of light in any of said optical states in the detector of the CAM.

Embodiments of the disclosure will be described in more detail below, by way of illustrative and non-limiting example, with reference to the accompanying drawings.

DETAILED DESCRIPTION

Figure 1:
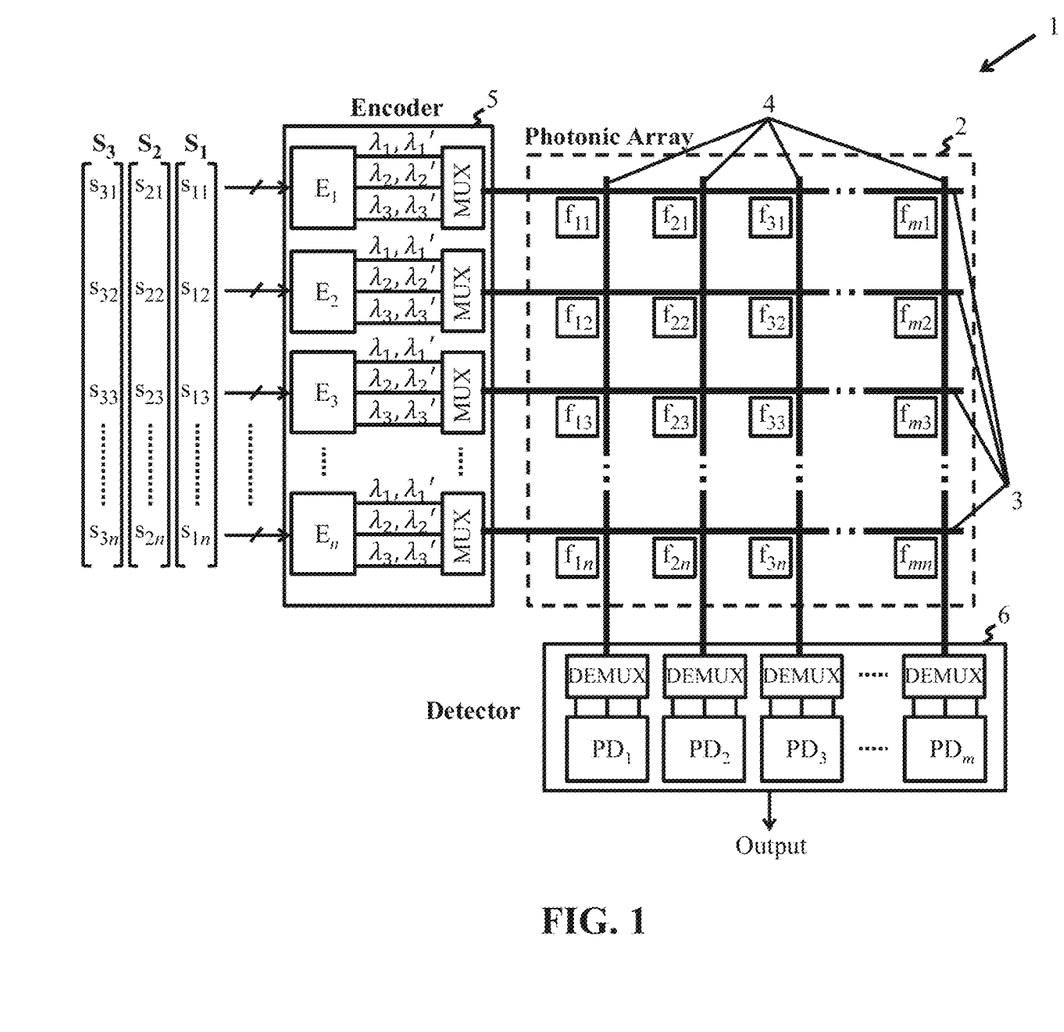
FIG. 1 is a schematic illustration of a photonic CAM embodying the disclosure.

FIG. 1 shows components of an exemplary photonic CAM embodying the disclosure. The CAM 1 includes a photonic cross-bar array, indicated generally at 2, comprising a plurality of row and column waveguides. The array 2 is an n-by-m array in this embodiment, having n row waveguides 3 and m column waveguides 4. The CAM 1 includes a plurality of photonic filter devices denoted by $f_{ij}$ (i=1 to m, j=1 to n) in the figure. Each filter device $f_{ij}$ is located at a respective cross-point of a row and column waveguide for selectively coupling light from the row waveguide j to the column waveguide i at that cross-point. The CAM further comprises an encoder, indicated generally at 5, and a detector indicated generally at 6. The encoder 5 is adapted to encode a plurality of input bit-strings into optical signals which are supplied to row waveguides of array 2. The detector 6 is adapted to detect the optical signals which are coupled from the row waveguides to the column waveguides of the array.

Each filter device $f_{ij}$ is selectively programmable in first and second states representing respective stored bit values. Each column i=1 to m of these filter devices can thus be programmed with a stored bit-string (stored word) with which the input bit-strings (input words) are to be compared. When in the first programmable state (corresponding to a stored bit value of 1 in this example), each filter device $f_{ij}$ is operable to filter out light in any of a first plurality of optical states from light coupled to the column waveguide i. When in the second programmable state (corresponding to a stored bit value of 0 in this example), each filter device $f_{ij}$ is operable to filter out light in any of a second, different plurality of optical states from light coupled to the column waveguide i. In this embodiment, the various optical states correspond to respective wavelengths of light. The first plurality of optical states comprises wavelengths denoted by $\lambda_1, \lambda_2, \lambda_3, \ldots$, etc., and the second plurality of optical states comprises wavelengths denoted by $\lambda_1', \lambda_2', \lambda_3', \ldots$, etc.

The encoder 5 is operable to encode a plurality of input words into optical signals such that bit values in different input words are encoded using optical signals in different pairs of optical states, where each pair comprises one state from each of the first and second plurality of states. FIG. 1 shows three input words, denoted here by $S_k$ (k={1, 2, 3}), each comprising bits $S_{k1}, S_{k2}, \ldots, S_{kn}$. Each input word $S_k$ is encoded using optical signals having a corresponding pair of wavelengths $\lambda_k, \lambda_k'$. In this example, a bit value 1 in $S_k$ is encoded into a signal of wavelength $\lambda_k$, and a bit value 0 in $S_k$ is encoded into a signal of wavelength $\lambda_k'$. In this embodiment, the encoder 5 includes a set of bit encoders $E_1$ to $E_n$ for receiving corresponding bits, $s_{k1}$ to $s_{kn}$, respectively, of the input words $S_k$. Hence, each bit encoder encodes an input bit of word $S_1$, into an optical signal of wavelength $\lambda_1$ (if the bit value is 1) or $\lambda_1'$ (if the bit value is 0). An input bit of word $S_2$ is encoded into an optical signal of wavelength $\lambda_2$ (if the bit value is 1) or $\lambda_2'$ (if the bit value is 0). An input bit of word $S_3$ is encoded into an optical signal of wavelength $\lambda_3$ (if the bit value is 1) or $\lambda_3'$ (if the bit value is 0). While three input words are shown here for simplicity, additional input words $S_k$, k=4, 5, 6, etc., can be similarly encoded in encoder 5 using corresponding wavelength pairs $\lambda_k, \lambda_k'$.

The optical signals output by each bit encoder $E_1$ to $E_n$ are supplied to a corresponding multiplexer (MUX) which is coupled to a respective row waveguide 3 of array 2. Hence, the encoder 5 simultaneously supplies the optical signals corresponding to each bit-position in input words $S_k$ to a respective row waveguide of the array. Signals on each row waveguide are selectively coupled to the column waveguide at each array cross-point in dependence on the programmed state of the filter device $f_1$ at that cross-point. If the filter device $f_1$ is programmed to store a bit value 1, then optical signals of wavelength $\lambda_1, \lambda_2, \lambda_3, \ldots$, etc., (which encode an input bit of value 1) will be filtered out. Only signals of wavelength $\lambda_1', \lambda_2', \lambda_3', \ldots$, etc. (which encode an input bit of value 0) will be transmitted to the column waveguide. Conversely, if the filter device $f_{ij}$ is programmed to store a bit value 0, then optical signals of wavelength $\lambda_1', \lambda_2', \lambda_3'$, etc., (which encode an input bit of value 0) will be filtered out, and signals of wavelength $\lambda_1, \lambda_2, \lambda_3, \ldots$, etc., (which encode an input bit of value 1) will be transmitted to the column waveguide. Thus, if an input bit $s_{kj}$ matches the bit stored in device $f_{ij}$, then no optical signal is transmitted to the column waveguide for that bit. If all bits $s_{k1}$ to $s_{kn}$ of a given input word $S_k$ match the corresponding bits stored in devices $f_{i1}$ to $f_{in}$ of a given column i of the array, then no signals of wavelength $\lambda_k$ or $\lambda_k'$ will be transmitted to the column waveguide for that column i of the array.

The detector 6 is adapted to detect light in any of the first and second plurality of optical states (here wavelengths $\lambda_1, \lambda_2, \lambda_3, \ldots$, and $\lambda_1', \lambda_2', \lambda_3', \ldots$,) in each column waveguide of the array. In this embodiment, the detector comprises a set of demultiplexers (DEMUX) coupled to respective column waveguides, and a corresponding set of photodetectors $PD_1$ to $PD_n$. Each demultiplexer separates the light output on the associated column waveguide 4 into its component wavelengths, and supplies the resulting signals (if any) to the corresponding photodetector. Each photodetector is adapted to detect light at all pairs of wavelengths $\lambda_k, \lambda_k'$ used for encoding the input words $S_k$, thereby identifying any mismatch between each input bit-string and bit values stored in corresponding column of filter devices. If a photodetector $PD_i$ detects light at any wavelength $\lambda_k, \lambda_k'$, then the corresponding input word $S_k$ does not match the stored word in column i of the array. Hence, a given input word can be compared with all stored words in parallel. In addition, since different pairs of optical states $\lambda_k, \lambda_k'$ are used to encode each input word $S_k$, all input words can be simultaneously compared to words stored in the array. This simultaneous search facility offers massively enhanced throughput for CAM search operations.

The CAM 1 can be adapted to provide an output dependent on the particular search application. For a simple match/mismatch search described above, the detector may provide an output indicating, for each column waveguide i, whether each input bit-string $S_k$ matches the bit values stored in the filter devices coupling light to that waveguide. For example, each photodetector $PD_i$ may provide a k-bit output indicating whether each input signal $S_k$ matches (1) or mismatches (0) the word stored in column i. Alternatively, or in addition, the detector 6 may be connected to logic for performing a desired processing operation dependent the results of detection of light by the detector. Illustrative examples of such application-dependent logic are described below.

Figure 2:
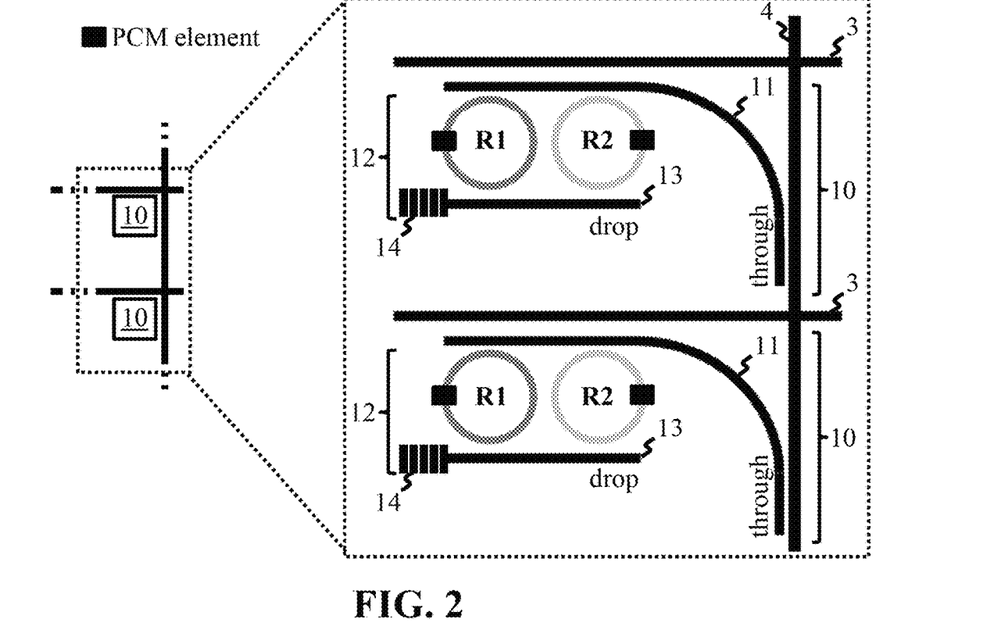
FIG. 2 illustrates structure of photonic filter devices used in an embodiment of the CAM.

FIG. 2 is a more detailed illustration of the filter devices $f_{ij}$ in a preferred embodiment of CAM 1. The enlargement in this figure shows two filter devices 10 at adjacent cross-points of a column waveguide 4 with two row waveguides 3. Each filter device 10 comprises a directional coupler and a programmable filter. The directional coupler is implemented here by a broadband coupling waveguide 11 for coupling light of all operational wavelengths from the row waveguide to the column waveguide. (Note here that no coupling occurs at actual cross-points of row and column waveguides in the array, any coupling losses here being negligible for the operation described). The directional couplers 11 of all filter devices 10 in the array are adapted for equal distribution of optical power between column waveguides of the array.

The programmable filter, which can be selectively programmed into the first and second programmable states, comprises a frequency filter in this embodiment. The frequency filter, indicated generally at 12, comprises first and second ring resonators, R1 and R2, and a drop port implemented by a waveguide 13 and a grating 14. The first ring resonator R1 is operable, in the first programmable state of frequency filter 12, to filter out light with any of the first plurality of wavelengths $\lambda_1, \lambda_2, \lambda_3, \ldots$, from light transmitted to the column waveguide via directional coupler 11. The second ring resonator R2 is operable, in the second programmable state of the frequency filter, to filter out light with any of the second plurality of wavelengths $\lambda_1', \lambda_2', \lambda_3', \ldots$, from light transmitted to the column waveguide.

As illustrated in the figure, the ring resonators R1 and R2 include respective memory elements, here phase-change memory (PCM) elements, which are programmable to tune the ring resonators for operation in the first and second programmable states. Each PCM element can be implemented by a layer of PCM material (e.g. a chalcogenide such as GST (germanium-antimony-tellurium)) overlying a portion of the ring resonator waveguide. As is well known in the art, such PCM elements can be programmed into amorphous or crystalline states, having different opto-electrical properties, by heating the PCM material. Heat may be applied here by application of a programming voltage to a heater, e.g., a metal layer, overlying the PCM material. Alternatively, heating may be effected by applying a light signal to the PCM material with appropriate power to induce the desired phase state.

Figure 3:
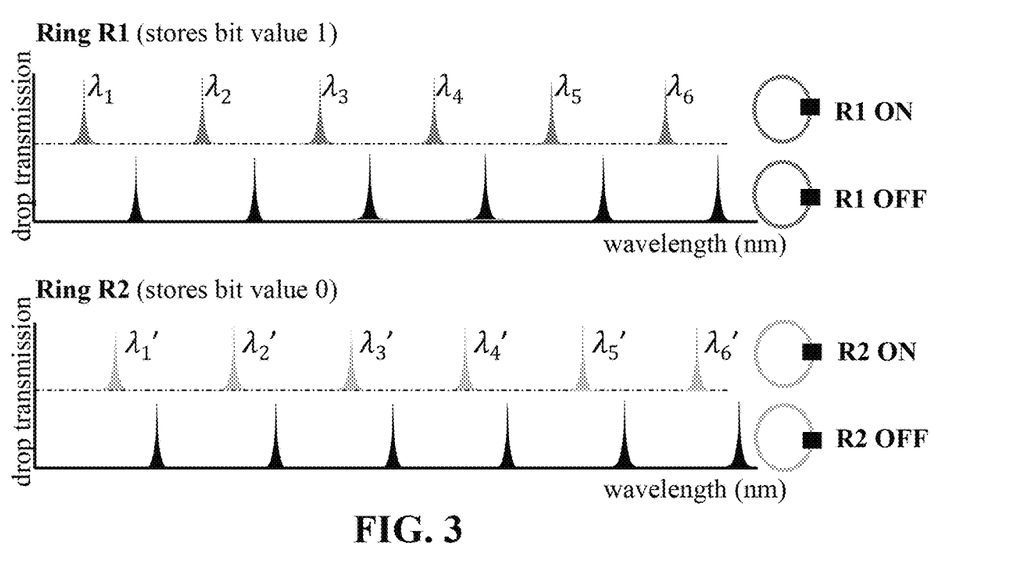
FIG. 3 illustrates operation of the filter devices of FIG. 2.

The selective filtering by filter devices 10 exploits wavelengths in the resonance spectrum of the ring resonators R1 and R2. FIG. 3 illustrates tuning of the rings resonators for operation in the two programmable states of a filter device. The upper diagram here shows the resonance spectrum of ring R1 in the two programmable states (crystalline and amorphous) of the PCM element of that ring. In the ON (e.g. crystalline) state, wavelengths $\lambda_1, \lambda_2, \lambda_3, \ldots$, are evanescently coupled into ring R1 from directional coupler 11. These wavelengths are then coupled from R1 to drop port 13 and dispersed by grating 14. Hence, when R1 is ON, all wavelengths $\lambda_1, \lambda_2, \lambda_3, \ldots$, on the associated row waveguide 3 are transmitted to the drop port, and so filtered out from light coupled to the column waveguide 4. In the OFF state of ring R1, the resonance wavelengths are shifted as indicated, whereby wavelengths $\lambda_1, \lambda_2, \lambda_3, \ldots$, will be transmitted to the column waveguide. Similarly, when ring R2 is ON as indicated in the lower diagram, all wavelengths $\lambda_1', \lambda_2', \lambda_3', \ldots$, on the row waveguide are transmitted to the drop port and so filtered out from light coupled to the column waveguide 4. When ring R2 is OFF, all wavelengths $\lambda_1', \lambda_2', \lambda_3'$, will be transmitted to the column waveguide.

Figure 4:
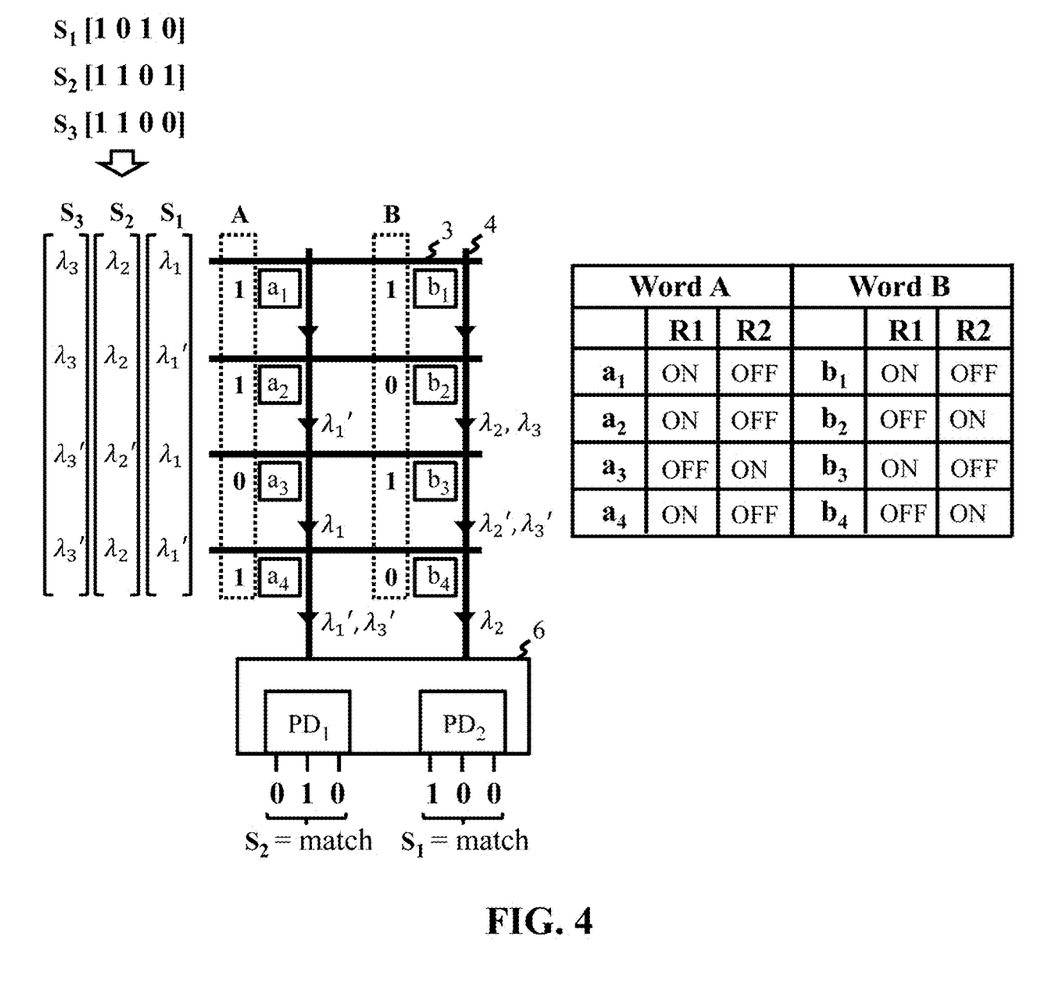
FIG. 4 illustrates binary CAM operation for a simple example.

In the first programmable state of filter device 10, ring R1 is ON (representing a stored bit value of 1) and ring R2 is OFF. Wavelengths $\lambda_1, \lambda_2, \lambda_3, \ldots$, (which encode bit values 1 in the input words) will thus be dropped, while wavelengths $\lambda_1', \lambda_2', \lambda_3', \ldots$, (which encode bit values 0 in the input words) will be transmitted to the column waveguide. In the second programmable state of device 10, ring R2 is ON (representing a stored bit value of 0) and ring R2 is OFF. Wavelengths $\lambda_1', \lambda_2', \lambda_3', \ldots$, (which encode bit values 0) will thus be dropped, while wavelengths $\lambda_1, \lambda_2, \lambda_3, \ldots$, (which encode bit values 1) will be transmitted. FIG. 4 is a schematic illustration of the resulting filtering operation in relation to a simple example. This figure shows two columns of an array having n=4 filter devices 10 per column. Devices in the first column, labeled $a_1$ to $a_4$ here, store respective bits of a first word A as indicated. Devices in in the second column, labeled $b_1$ to $b_4$, store respective bits of a second word B. The corresponding states of resonators R1 and R2 for these devices are indicated in the table in the figure.

Array operation is illustrated for three input words, $S_1$ to $S_3$, whose bit values are encoded as shown using respective pairs of wavelengths $\lambda_k, \lambda_k'$. The labelled arrows on the column waveguides next to each filter device indicate the input wavelengths which are transmitted by that device. For the first column, photodetector $PD_1$ detects wavelengths used to encode inputs $S_1$ and $S_3$, indicating a mismatch with word A. At wavelengths $\lambda_2, \lambda_2'$, however, no signal (or less than a predetermined threshold level to accommodate expected coupling losses) is detected, indicating a match between $S_2$ and A. The output of $PD_1$ thus correctly indicates a match with $S_2$. Similarly, the output of $PD_2$ correctly indicates a match between $S_1$ and word B.

It will be appreciated that the CAM 1 can be fabricated as an integrated, on-chip structure using standard material processing techniques. Array 2 can be implemented using nanophotonic waveguides and micro-ring resonators (MMRs) for rings R1 and R2 of filter devices $f_{ij}$. Note that all filter devices $f_{ij}$ are identical, providing a particularly simple design and facilitating array fabrication. The encoder 5 and detector 6 can be implemented using generally-known devices and well-known techniques as will be apparent to those skilled in the art. For example, optical signals at the required wavelengths may be generated by integrated lasers in encoder 5. The photodetectors $PD_i$ may be implemented by photodiodes in detector 6.

The above embodiment provides an exceptionally area- and energy-efficient CAM implementation, with superfast operation by simultaneous searching of multiple input bit-strings. While operation with three input words is described for simplicity, ring resonators can support many hundreds of resonant modes. This offers orders of magnitude greater throughput for parallel searches, constrained only by the number of signal wavelengths that can be generated in practical designs. By way of example, simultaneous searching of up to about a hundred input words may be feasible with current technology, with around 20 to 30 parallel input words being sufficient for many applications.

Programming of the array 2 can be performed in known manner by a controller (not shown in FIG. 1), e.g. a processor which receives the words to be stored in the array and applies appropriate programming signals to filter devices $f_{ij}$. The filter design of FIG. 2 offers ease of programming (and reprogramming) by use of PCM elements as described above, and non-volatile storage for low-energy operation. The pair of ring resonators storing respective bits 1 and 0 provides high SNR (signal-to-noise ratio) operation. Signal detection in detector 6 is a simple binary operation, whereby any signal above the predetermined match threshold can be regarded as a mismatch. This match threshold can be low and can be set just above the noise threshold for detector operation.

The input bit-strings to encoder 5 may be defined, in general, by electrical or optical input signals. Note also that, while a regular array of parallel, orthogonal row and column waveguides is shown in FIG. 1, in general waveguides need not be parallel or regularly spaced, and row and column waveguides need not be orthogonal. However, this array structure provides a particularly efficient implementation. "Row" and "column" waveguides are of course interchangeable and not intended to imply any particular array orientation. Also, the programming/coding of 1's and 0's described above can of course be reversed.

Various other implementations of filter devices $f_{ij}$ can be envisaged. For example, other non-volatile memory elements, e.g. resistive memory elements, may be used in some embodiments. Other embodiments may use volatile memory elements based on modulators using nanomechanical, electro-optical, plasma dispersion or thermal effects. The directional couplers may be implemented by other devices such as MZIs (Mach-Zehnder Interferometers), and the programmable filters may be implemented by tunable gratings for example. Also, embodiments can be envisaged in which the optical states used to encode input bits correspond to different polarization states, rather than different wavelengths, of light. In this case, a filter devices $f_{ij}$ may be implemented using devices, such as meta-waveguides, which are sensitive to different polarizations of light and can be tuned to selectively filter out required polarization states. Suitable implementations here will be apparent to those skilled in the art from the operation described herein.

Figure 5:
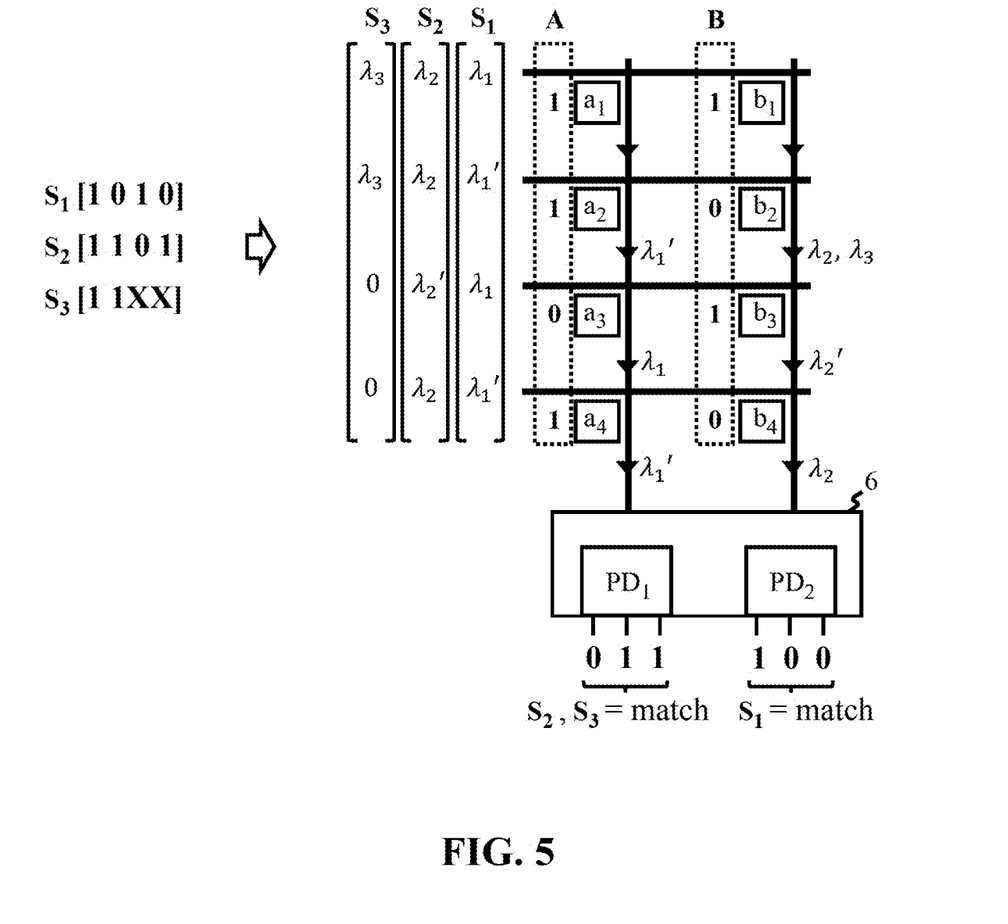
FIG. 5 illustrates ternary CAM operation for a simple example.

CAMs embodying the disclosure can be readily adapted for ternary CAM operation. In particular, the encoder 5 can be adapted to encode input bit-strings comprising bit values 0, 1 and X (where X indicates a don't-care bit) such that bit values 0 and 1 in a bit-string are encoded using optical signals in a pair of states $\lambda_k, \lambda_k'$, and a bit value X is encoded as zero signal. FIG. 5 illustrates this operation for the same example as FIG. 4, but where input $S_3$ contains two don't-care bits X. Since X is encoded as zero signal in encoder 5, no wavelength $\lambda_3$ or $\lambda_3'$ is transmitted by filter devices $a_3$, $a_4$, $b_3$ or $b_4$ for these bits, whereby X matches both stored bit values 1 and 0. Detector 6 thus detects an additional match for $S_3$ with stored word A here.

Figure 6:
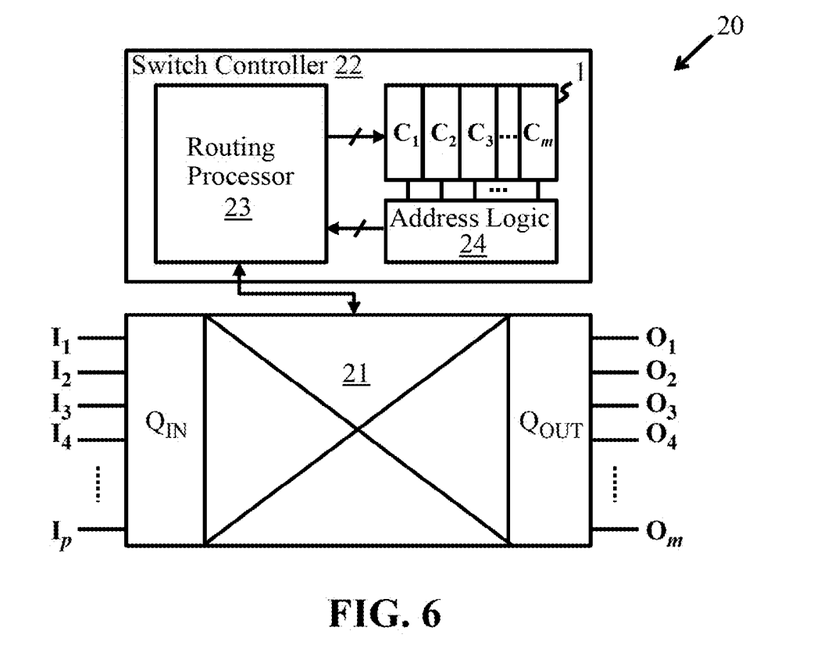
FIG. 6 is a schematic illustration of a network switching device embodying the disclosure.

CAMs embodying the disclosure can be applied to particular advantage in network switching devices, such as routers, switches, gateways, etc., where input data packets must be forwarded to the appropriate device output ports for onward transmission in the network. FIG. 6 is a schematic illustration of one embodiment of such a switching device. In this example, a router 20 has a set of input ports $I_1$ to $I_p$ for receiving input data packets from network nodes, and a set of output ports $O_1$ to $O_m$ for output of data packets to network nodes. Packets received at the input ports are forwarded to the output ports via a high-speed switch fabric 21. Input packets are queued as necessary in input queue buffers $Q_{IN}$. Packets forwarded to the output ports are queued as necessary in output queue buffers $Q_{OUT}$ before processing and onward transmission to the network.

The appropriate output ports for forwarding of input packets depends on the destination address bit-strings contained in the input packets. The forwarding operation is controlled by a switch controller 22 which compares the address bit-strings in input packets with network addresses stored in a CAM. In particular, switch controller 22 comprises a CAM 1 as described above and a routing processor 23 for controlling the address lookup operation. The network addresses to be compared with input packet addresses are stored by processor 23 in respective columns of the filter devices $f_{ij}$ in CAM 1. These columns are indicated schematically as $C_1$ to $C_m$ in the figure, where typical address space here is 7 to 15 bits. Each column $C_1$ to $C_m$ corresponds to the address of a respective output port $O_1$ to $O_m$. If an input packet address matches that stored in a given column $C_i$, then that packet should be forward to the corresponding output port $O_1$ for onward transmission. The output of CAM detector 6 (omitted in this figure) is supplied to address logic 24. This address logic returns the output port addresses for respective input packets to routing processor 23. The routing processor then controls forwarding of packets by switch fabric 21 to the correct output ports.

In operation of router 20, the routing processor 23 reads the addresses from packets arriving at the input ports, and provides the addresses from a plurality of input packets as the input bit-strings to CAM 1. Address logic 24 thus simultaneously determines the appropriate output ports for those data packets based on matching of the input packet addresses to addresses stored in the CAM.

In a typical network, multiple network nodes will be in communication with router 20 at any given time instant. When the arrival rate of packets exceeds the rate of output routing, data trafficking (queuing) occurs. Routing bandwidth is thus limited by the speed with which the output port address for a given input data packet can be searched. Even with the fastest imaginable electronic CAMs, data trafficking cannot be mitigated due to the serial nature of CAM searches. This represents a severe bottleneck, and contributes to large communication latencies. By simultaneously searching multiple input packet addresses in CAM 1, router 20 offers massively increased throughput, alleviating this bottleneck and significantly enhancing network bandwidth.

Another emerging requirement for network switching devices is the ability to on-the-fly program the CAM for flexible use and for in-memory logic computations, e.g., to make a routing decision, change output port addresses, or perform application-level computations on the packets. CAMs embodying the disclosure offer the facility for in-memory logic operations to accommodate such requirements. In particular, the CAM encoder can be adapted to encode, for each input search word, at least one additional, logic bit associated with that word using at least one additional optical signal in at least one additional optical state, different to states in the first and second plurality of states used for encoding search words. The additional optical signals for corresponding logic bits of the search words are supplied simultaneously to a row waveguide of the array. In addition, a plurality of programmable logic devices can be provided in the array, these logic devices being arranged for selectively coupling the additional optical signals to the column waveguides. The CAM detector is then operable to detect the additional optical signals in each column waveguide. An exemplary embodiment here is described below with reference to FIGS. 7a and 7b.

Figure 7A:
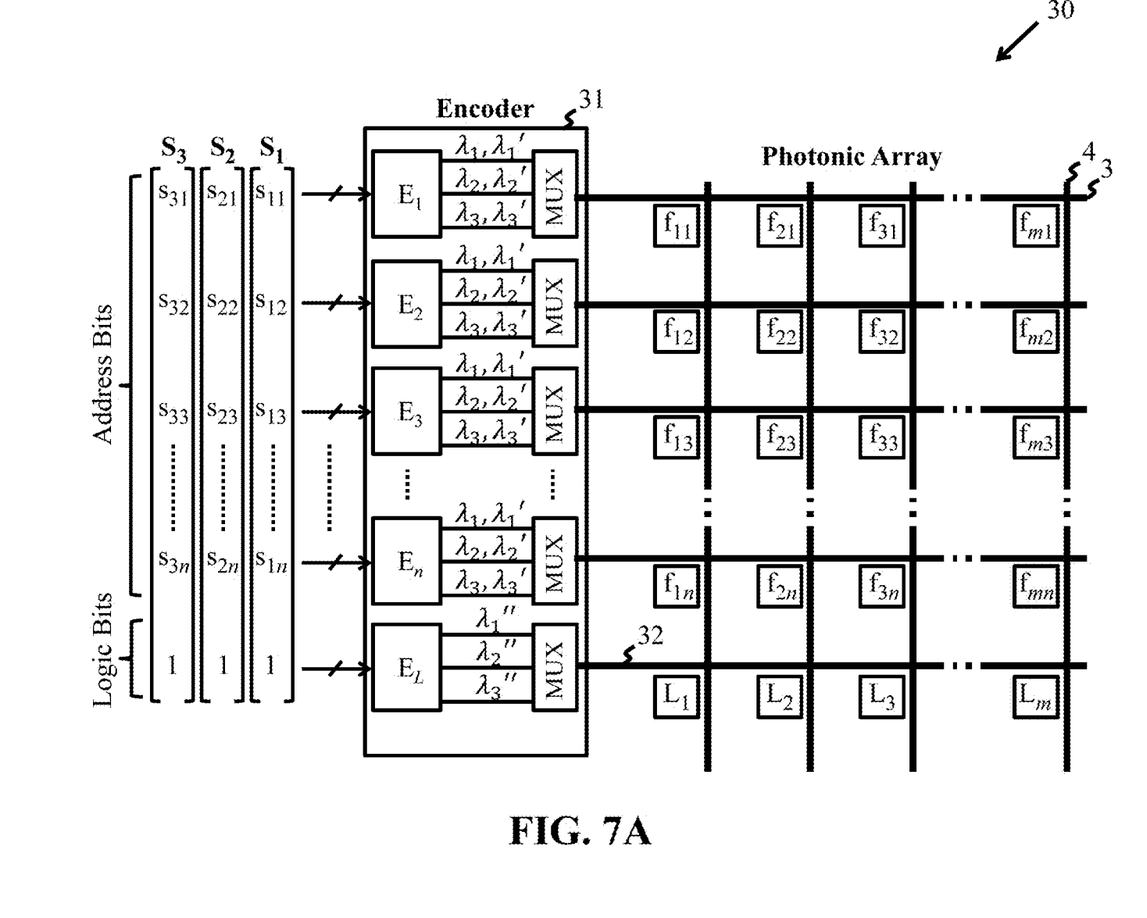
FIGS. 7a and 7b illustrate structure and operation of a CAM incorporating in-memory logic in an embodiment of the disclosure.

FIG. 7a shows a CAM 30 in which features corresponding to those of CAM 1 (FIG. 1) are indicated by like reference labels. Each input word $S_k$ here includes the string of address bits $s_{k1}$ to $s_{kn}$, and an additional logic bit, here set to value 1. The encoder 31 includes an additional bit-encoder $E_L$ for encoding these logic bits. In particular, the logic bit in an input word $S_k$ is encoded using an additional wavelength $\lambda_k''$. This wavelength $\lambda_k''$ is different to all other operational wavelengths $\lambda_k$, $\lambda_k'$, and may be different for different input words as indicated in the figure. The resulting optical signals at wavelengths $\lambda_1''$, $\lambda_2'$ and $\lambda_3''$ are wavelength-division multiplexed onto a row waveguide 32 of the array.

Figure 7B:
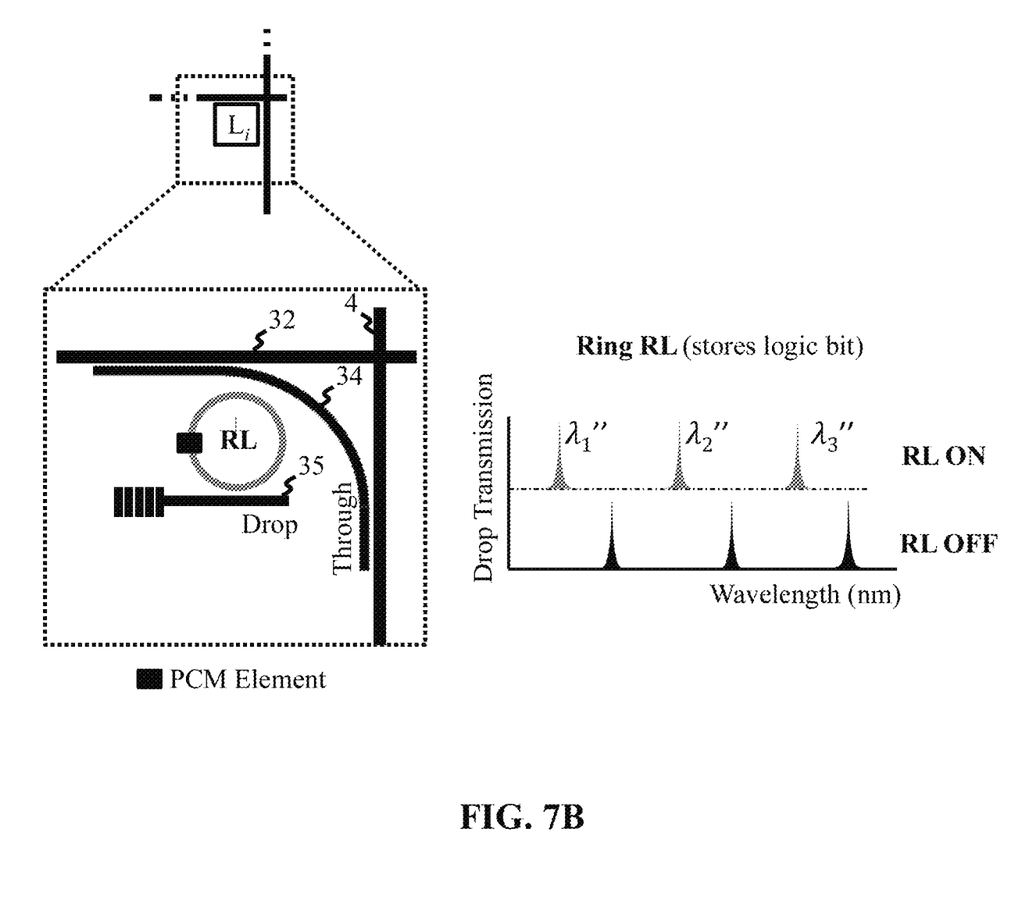

A plurality of programmable logic devices, denoted by $L_1$ to $L_m$, are provided at respective cross-points of column waveguides 4 with row waveguide 32. The structure and operation of these logic devices $L_i$ are illustrated in FIG. 7b. Each device $L_i$ comprises a directional coupler, here broadband coupling waveguide 34, for coupling light from row waveguide 32 to the column waveguide, and a programmable frequency filter. The frequency filter is implemented here by a ring resonator RL having a memory element (here a PCM element) which is programmable to tune the resonator RL for filtering out light having a wavelength $\lambda_k''$. In the ON state of resonator RL (corresponding to a stored logic bit of value 1), wavelengths $\lambda_1''\lambda_2''$ and $\lambda_3''$ are coupled to drop port 35 and thus not transmitted to the column waveguide. In the OFF state of RL (corresponding to a stored logic bit of value 0), wavelengths $\lambda_1''$, $\lambda_2''$ and $\lambda_3''$ will be transmitted to the column waveguide. The CAM detector 6 (not shown in FIG. 7a) is operable to detect light at wavelengths $A_1''$, $A_2''$ and $\lambda_3''$ on each column waveguide, thereby identifying any mismatch between the input logic bits and the logic bits stored in the logic devices $L_i$.

Figure 8:
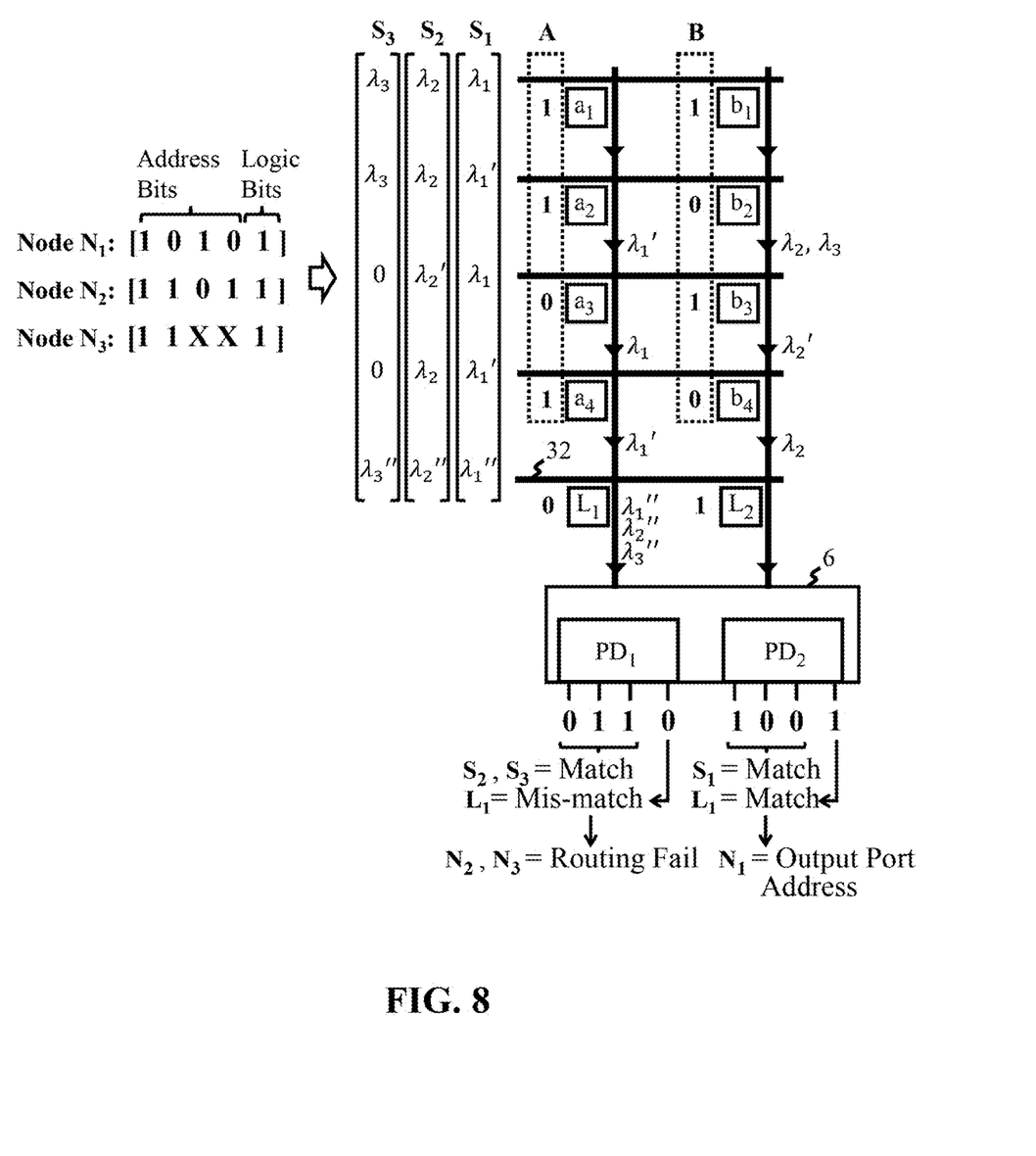
FIG. 8 illustrates operation of the in-memory logic in a routing application.

FIG. 8 illustrates operation of CAM 30 for a simple example. This example corresponds to that of FIG. 5 with additional logic devices $L_1$ and $L_2$ in respective columns of the array. Here, for routing to occur, the address bit-string $S_k$ in the packet from a node $N_k$ must match that in a column of the CAM, but the logic bits must also match. In this example, therefore, with $L_1$ set to 0, the detector $PD_1$ will output a 0 (mismatch) for the logic bit comparison in the first column. The router address logic (24 in FIG. 6) will therefore indicate a "routing failed" decision for the packets from nodes $N_2$ and $N_3$. In the second column, however, the logic bits match for node $N_1$ and the address logic will return the output port address corresponding to column 2 for node $N_1$.

The simple, in-memory logic scheme described above can be used to control routing decisions. For example, if an output port is overloaded or if a destination node does not want to provide access, e.g. for maintenance or confidentially reasons, then the logic device for that output port address can be set to OFF. While a simple example is described here, it will be appreciated that one or a combination of different logic bits may be used to implement various other routing control schemes, and more complex Boolean operations can be performed using detector outputs from the array columns. Such embodiments offer full flexibility in CAM programming, whether for reconfiguring for different output port addresses or for performing in-memory logic operations.

Figure 9:
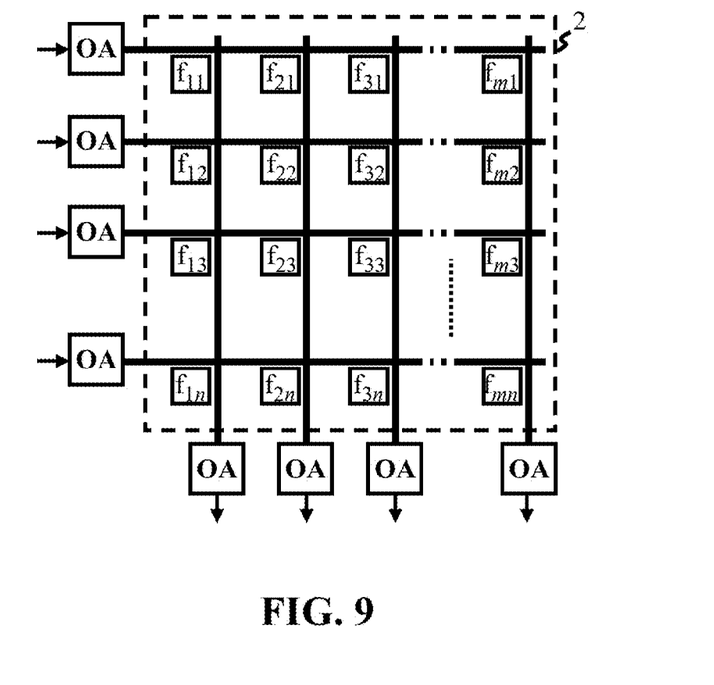
FIG. 9 illustrates additional features of CAMs embodying the disclosure.

Optical losses in the photonic cross-bar array increase quadratically with the array size (n by m), and this constrains scalability of the cross-bar dimensions. To improve the signal quality, CAMs embodying the disclosure may include an optical amplifier, provided between each column waveguide and the detector, as illustrated schematically in FIG. 9. Here, a broadband optical amplifier (OA) is provided at the output of each column for amplifying the accumulated light signals in the column waveguide before feeding into the detector (not shown). In addition, or as an alternative, the encoder may be adapted to scale the amplitude of optical signals supplied to the row waveguides. This can be achieved using high input-coupling into the rows and/or amplification by broadband optical amplifiers at the row inputs as illustrated. In general, however, limiting array size can mitigate optical losses to acceptable levels. For example, an array size of 64 by 64 for routing applications allows search operations on IPv4 (4 Byte), IPv6 (8 bytes) protocols, as well as MAC address searches (6 Byte). Of course, other protocols that rely on reduced word length (3 Byte and smaller) can also be used.

Figure 10:
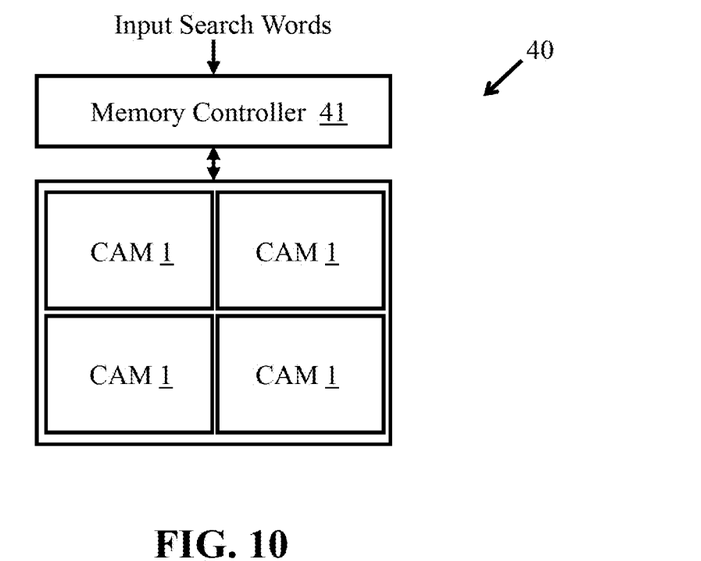
FIG. 10 illustrates memory apparatus using multiple CAMs embodying the disclosure.

Network switching devices and other apparatus embodying the disclosure may exploit a plurality of CAMs for parallel search operations. For instance, for a search over a large number of output port addresses, the search operation can be broadcast across multiple arrays. FIG. 10 shows an example of such memory apparatus. This apparatus 40 comprises a plurality of CAMs, here four CAMs 1 as described above, and a memory controller 41 for supplying input bit-strings in parallel to the CAMs. The memory controller 41 may comprise an optical or electrical processor which is compatible with passive/quasi-passive photonic arrays as described above.

Figure 11A:
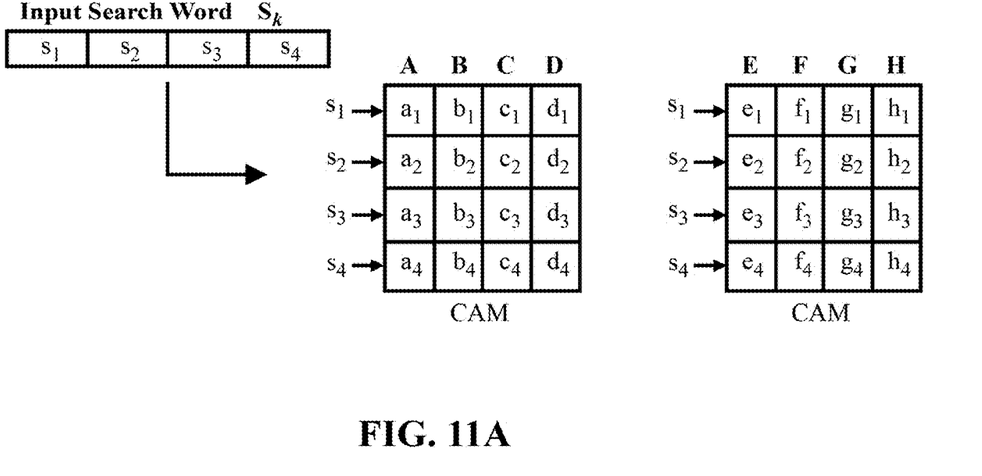
FIGS. 11a and 11b illustrate different operating modes of the FIG. 10 apparatus.
Figure 11B:
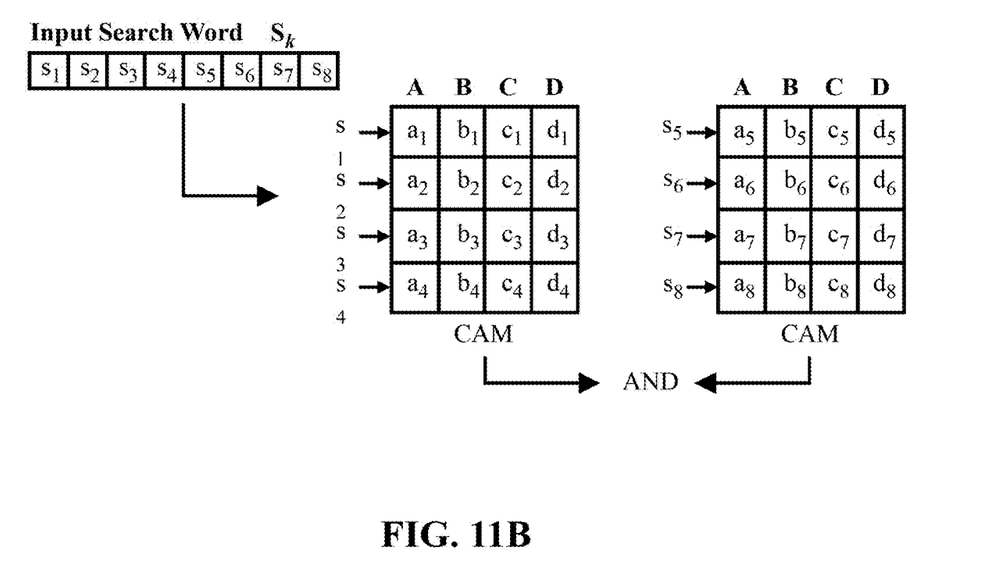

FIGS. 11a and 11b illustrate exemplary operating modes of the memory apparatus 40, here for simple 4 by 4 arrays. In FIG. 11a, each input search word $S_k$ is supplied to each of a plurality (here two) of the CAMS 1, each storing a different set of stored words (A through D, and E though H, respectively). This allows searching over a large number of words, e.g. output port addresses, in parallel using modestly-sized arrays, allowing N by M parallel searches where N is the number of columns and M is the number of arrays. In FIG. 11b, each input search word $S_k$ is parsed into sections (here two sections) and different sections are supplied to respective CAMs 1 each storing different sections (e.g. bits $a_1$ through $a_4$, and as through $a_8$ of word A) of the same set of stored words (A through D). A logical AND applied to the outputs of the two arrays for a given input word then determines if there is an overall match. This allows parallel search operations to be performed for longer word lengths distributed over different arrays.

CAMs embodying the disclosure can be applied to advantage in various applications other than routing, and outputs of these CAMs can be processed as appropriate for the application in question. By way of example, embodiments can be adapted to perform Hamming difference calculations for multiple input bit-strings simultaneously. In this application, the intensity of light having either of a pair of wavelengths $\lambda_k$, $\lambda_k'$ encoding a given input bit-string can be detected by the CAM detector for each column. This intensity then provides a measure of the number of bits by which the input bit-string differs from the stored bit string. Various other applications, including cache memories, decision trees, associative search operations for neural networks, and data mining applications can also benefit from CAMs embodying the disclosure. In general, these CAMs can be used in any application where a plurality of first bit-strings need to be compared with each of a plurality of second bit-strings to determine a comparison result. The comparisons can be performed simultaneously by: storing each second bit string in a CAM embodying the disclosure such that successive bits are stored in filter devices located at successive cross-points of a column waveguide with the row waveguides; supplying the plurality of first bit-strings as the input bit-strings to the CAM encoder; and determining the required comparison result in dependence on detection of light in the CAM detector.

It will be seen that the above embodiments offer compact and efficient architectures for ultrafast, energy-efficient CAMs. It will of course be appreciated that various changes and modifications can be made to the exemplary embodiments described. By way of example, alternatives/modifications described in relation one embodiment may be applied to other embodiments as appropriate. In general, where features are described herein with reference to a CAM embodying the disclosure, corresponding features may be provided in memory apparatus/methods using such CAMs, and vice versa.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A photonic content-addressable memory comprising:
   a photonic cross-bar array comprising a plurality of row and column waveguides;
   a plurality of photonic filter devices, each located at a respective cross-point of the row waveguides and the column waveguides for selectively coupling light from the row waveguides to the column waveguides at the cross-point, wherein each of the photonic filter devices is selectively programmable in first and second states representing respective stored bit values, and each of the photonic filter devices is operable, in said first state, to filter out light in any of a first plurality of optical states from light coupled to the column waveguides and, in said second state, to filter out light in any of a second, different plurality of optical states from light coupled to the column waveguides, wherein each of the photonic filter devices comprises a directional coupler for coupling light from the row waveguides to the column waveguides, and a programmable filter for operation in the first and second states, wherein the programmable filter comprises a frequency filter for filtering out light having any of a first plurality of wavelengths in the first state and any of a second plurality of wavelengths in the second state;
   an encoder for encoding a plurality of input bit-strings into optical signals such that the stored bit values in different of the input bit-strings are encoded using the optical signals in different pairs of the first and second plurality of optical states, each of the different pairs comprising one state from each of said first and second plurality of optical states, and to simultaneously supply the optical signals corresponding to each bit-position in the input bit-strings to a respective one of the row waveguides of the photonic cross-bar array; and a detector for detecting light in any of said first and second plurality of optical states in the column waveguides, thereby identifying any mismatch between each of the input bit-strings and the stored bit values in the photonic filter devices coupling light to the column waveguides.

2. The photonic content-addressable memory of claim 1, wherein the encoder is adapted to encode the input bit-strings comprising bit values 0, 1 and X, wherein the bit value X indicates a don't-care bit, such that the bit value 0 and the bit value 1 in the input bit-strings are encoded using the optical signals in said different pairs of plurality of optical states and the bit value X is encoded as a zero signal.

3. The photonic content-addressable memory of claim 1, wherein said first and second plurality of optical states correspond to one of respective wavelengths of light and respective polarization states of light.

4. The photonic content-addressable memory of claim 1, wherein the directional coupler is adapted for equal distribution of optical power between the column waveguides of the photonic cross-bar array.

5. The photonic content-addressable memory of claim 1, wherein said first and second plurality of optical states correspond to respective wavelengths of light.

6. The photonic content-addressable memory of claim 5, wherein the frequency filter comprises first and second ring resonators which are operable to filter out said light in the first and second states respectively.

7. The photonic content-addressable memory of claim 6, wherein the first and second ring resonators include respective memory elements which are programmable to tune the first and second ring resonators for operation in said first and second states.

8. The photonic content-addressable memory of claim 7, wherein each of the memory elements comprises a phase-change memory element.

9. The photonic content-addressable memory of claim 1, further comprising:
a plurality of programmable logic devices arranged for selectively coupling additional optical signals to the column waveguides,
wherein
the encoder is operable to encode, for each of the input bit-strings, at least one additional, logic bit associated with that input bit string using at least one additional optical signal in at least one additional optical state, different to states in said first and second plurality of states, and to supply the additional optical signals for corresponding logic bits of the input bit-strings simultaneously to the row waveguides of the photonic cross-bar array,
the detector is operable to detect the additional optical signals in each of the column waveguides.

10. The photonic content-addressable memory of claim 9, wherein said at least one additional optical state is different for different of the input bit-strings.

11. The photonic content-addressable memory of claim 9, wherein:

said first and second plurality of optical states correspond to respective wavelengths of light; and
said at least one additional optical state corresponds to an additional wavelength of light
each programmable logic device comprises a directional coupler for coupling light from a row waveguide to a column waveguides and a programmable frequency filter for selectively filtering out light having said additional wavelength from light coupled to the column waveguide.

12. The photonic content-addressable memory of claim 11, wherein the frequency filter comprises a ring resonator and a memory element which is programmable to tune the ring resonator for filtering out light having said additional wavelength.

13. The photonic content-addressable memory of claim 1, wherein the detector is adapted to produce an output indicating, for each of the column waveguides, whether each of the input bit-strings matches the stored bit values in the photonic filter devices coupling light to the column waveguides.

14. The photonic content-addressable memory of claim 1, wherein the detector is connected to logic for performing a processing operation dependent on detection of light in any of said first and second plurality of optical states by the detector.

15. The photonic content-addressable memory of claim 1, further comprising:
an optical amplifier provided between each of the column waveguides and the detector for amplifying light in the column waveguides.

16. The photonic content-addressable memory of claim 1, wherein the encoder is adapted to scale an amplitude of the optical signals supplied to the row waveguides.

17. A memory apparatus comprising:
a plurality of photonic content-addressable memories comprising:
a photonic cross-bar array comprising a plurality of row and column waveguides;
a plurality of photonic filter devices, each located at a respective cross-point of the row waveguides and the column waveguides for selectively coupling light from the row waveguides to the column waveguides at the cross-point, wherein each of the photonic filter devices is selectively programmable in first and second states representing respective stored bit values, and each of the photonic filter devices is operable, in said first state, to filter out light in any of a first plurality of optical states from light coupled to the column waveguides and, in said second state, to filter out light in any of a second, different plurality of optical states from light coupled to the column waveguides, wherein each of the photonic filter devices comprises a directional coupler for coupling light from the row waveguides to the column waveguides, and a programmable filter for operation in the first and second states, wherein the programmable filter comprises a frequency filter for filtering out light having any of a first plurality of wavelengths in the first state and any of a second plurality of wavelengths in the second state;
an encoder for encoding a plurality of input bit-strings into optical signals such that the stored bit values in different of the input bit-strings are encoded using the optical signals in different pairs of the first and second plurality of optical states, each of the different pairs comprising one state from each of said first and second plurality of optical states, and to simultaneously supply the optical signals corresponding to each bit-position in the input bit-strings to a respective one of the row waveguides of the photonic cross-bar array; and a detector for detecting light in any of said first and second plurality of optical states in the column waveguides, thereby identifying any mismatch between each of the input bit-strings and the stored bit values in the photonic filter devices coupling light to the column waveguides; and a memory controller for supplying the input bit-strings in parallel to the plurality of photonic content-addressable memories.

* * * * *